(12) United States Patent
Ozkan et al.

(10) Patent No.: US 7,488,462 B2
(45) Date of Patent: Feb. 10, 2009

(54) MULTI-STAGE CATALYST SYSTEMS AND USES THEREOF

(75) Inventors: Umit S. Ozkan, Worthington, OH (US); Erik M. Holmgreen, Columbus, OH (US); Matthew M. Yung, Columbus, OH (US)

(73) Assignee: The Ohio State University, Columbus, OH (US)

( * ) Notice: Subject to any disclaimer, the term of this patent is extended or adjusted under 35 U.S.C. 154(b) by 344 days.

(21) Appl. No.: 11/411,993

(22) Filed: Apr. 26, 2006

(65) Prior Publication Data

US 2007/0110651 A1    May 17, 2007

Related U.S. Application Data

(60) Provisional application No. 60/675,066, filed on Apr. 26, 2005, provisional application No. 60/674,991, filed on Apr. 26, 2005.

(51) Int. Cl.
*B01D 53/56* (2006.01)
*B01D 53/62* (2006.01)
*B01D 53/72* (2006.01)
*B01D 53/94* (2006.01)
*B01J 21/06* (2006.01)
*B01J 23/30* (2006.01)
*B01J 23/44* (2006.01)
*B01J 23/50* (2006.01)
*B01J 23/75* (2006.01)
*F01N 3/10* (2006.01)

(52) U.S. Cl. ............. 423/213.2; 423/213.5; 423/213.7; 423/239.1; 423/245.1; 423/245.3; 423/247; 60/274; 60/282; 60/299; 60/301; 422/169; 422/170; 422/171; 422/177; 422/180; 502/300; 502/325; 502/330; 502/339; 502/344; 502/347

(58) Field of Classification Search ............... 60/274, 60/282, 299, 301; 422/169, 170, 171, 177, 422/180; 423/213.2, 213.5, 213.7, 239.1, 423/245.1, 245.3, 247; 502/300, 325, 330, 502/339, 344, 347

See application file for complete search history.

(56) References Cited

U.S. PATENT DOCUMENTS

| | | | |
|---|---|---|---|
| 4,806,320 A | | 2/1989 | Nelson |
| 4,912,776 A | * | 3/1990 | Alcorn ............... 423/239.1 |
| 5,149,512 A | | 9/1992 | Li et al. |
| 5,224,334 A | * | 7/1993 | Bell .................. 60/274 |
| 5,240,689 A | | 8/1993 | Jones |
| 5,260,043 A | | 11/1993 | Li et al. |
| 5,308,810 A | | 5/1994 | Voss et al. |
| 5,336,476 A | | 8/1994 | Kintaichi et al. |
| 5,474,745 A | | 12/1995 | Fukui et al. |
| 5,571,763 A | | 11/1996 | Takemoto et al. |
| 5,650,127 A | | 7/1997 | Campbell et al. |
| 5,740,667 A | | 4/1998 | Bhattacharyya et al. |
| 5,891,409 A | * | 4/1999 | Hsiao et al. ............... 423/239.1 |
| 5,985,222 A | | 11/1999 | Sudduth et al. |
| 6,066,303 A | | 5/2000 | Sudduth et al. |
| 6,136,283 A | | 10/2000 | Stern |
| 6,193,942 B1 | | 2/2001 | Okuda et al. |
| 6,206,685 B1 | | 3/2001 | Zamansky et al. |
| 6,348,178 B1 | | 2/2002 | Sudduth et al. |
| 6,410,477 B1 | | 6/2002 | Ohtsuka et al. |
| 6,446,430 B1 | | 9/2002 | Roth et al. |
| 6,458,741 B1 | | 10/2002 | Roark et al. |
| 6,471,506 B1 | | 10/2002 | Zamansky et al. |
| 6,475,350 B2 | | 11/2002 | Palekar et al. |
| 6,514,470 B1 | | 2/2003 | Ott et al. |
| 6,557,342 B2 | | 5/2003 | Suga et al. |
| 6,562,753 B2 | | 5/2003 | Miyoshi et al. |
| 6,576,587 B2 | | 6/2003 | Labarge et al. |
| 6,602,481 B1 | | 8/2003 | Ohtsuka et al. |
| 6,682,709 B2 | | 1/2004 | Sudduth et al. |
| 6,729,125 B2 | | 5/2004 | Suga et al. |
| 6,753,294 B1 | | 6/2004 | Brisley et al. |
| 6,787,118 B2 | | 9/2004 | Roark et al. |
| 6,805,849 B1 | | 10/2004 | Andreasson et al. |
| 6,823,662 B1 | | 11/2004 | Yamamoto et al. |
| 2003/0093992 A1 | | 5/2003 | Suga et al. |
| 2004/0013591 A1 | | 1/2004 | Ohtsuka et al. |
| 2004/0013592 A1 | | 1/2004 | Ohtsuka et al. |

(Continued)

FOREIGN PATENT DOCUMENTS

WO    WO 01/45833 A1    6/2001

OTHER PUBLICATIONS

Federico Grillo, Marta Maria Natile, Glisenti, Low temperature oxidation of carbon monoxide: the influence of water and oxygen on the reactivity of a $Co_3O_4$ powder surface, Applied Catalysis B: Environmental, Apr. 8, 2004, pp. 267-274, vol. 48, Issue 4, Elsevier B.V.

*Primary Examiner*—Timothy C Vanoy
(74) *Attorney, Agent, or Firm*—Dinsmore & Shohl LLP

(57) ABSTRACT

Catalyst systems and methods provide benefits in reducing the content of nitrogen oxides in a gaseous stream containing nitric oxide (NO), hydrocarbons, carbon monoxide (CO), and oxygen ($O_2$). The catalyst system comprises an oxidation catalyst comprising a first metal supported on a first inorganic oxide for catalyzing the oxidation of NO to nitrogen dioxide ($NO_2$), and a reduction catalyst comprising a second metal supported on a second inorganic oxide for catalyzing the reduction of $NO_2$ to nitrogen ($N_2$).

19 Claims, No Drawings

U.S. PATENT DOCUMENTS

2004/0235654 A1 11/2004 Ohtsuka et al.
2005/0002839 A1 1/2005 Ohtsuka et al.
2006/0010859 A1 1/2006 Yan et al.
2007/0031310 A1* 2/2007 Lee .................. 423/239.1

* cited by examiner

MULTI-STAGE CATALYST SYSTEMS AND USES THEREOF

CROSS-REFERENCE TO RELATED APPLICATIONS

This application claims the benefit of U.S. Provisional Application Ser. No. 60/675,066 and U.S. Provisional Application Ser. No. 60/674,991, which were both filed on Apr. 26, 2005, and incorporates these applications in their entirety.

STATEMENT REGARDING FEDERALLY SPONSORED RESEARCH OR DEVELOPMENT

This invention was made with government support under Contract No. DE FC26-02NT4 1610 awarded by the United States Department of Energy. The government has certain fights in the invention.

FIELD OF THE INVENTION

The present invention is generally directed to systems and methods of catalytic removal of pollutants in a gaseous stream, and is specifically directed to systems and methods of catalytic removal of pollutants via catalyst systems comprising oxidation and reduction catalysts.

BACKGROUND OF THE INVENTION

Nitrogen oxides (NO, $NO_2$, $N_2O$) contribute to several environmental hazards including global warming, smog, ground level ozone formation, and acid rain. Emission reduction is possible through modification of combustion parameters, but reducing $NO_x$ emissions to acceptable levels requires effective aftertreatment technologies. Current catalytic $NO_x$ reduction control technologies include three-way catalysts and ammonia-based selective catalytic reduction. While these methods are highly effective for current combustion technologies, they are unsuitable for the next generation of high efficiency lean-burn natural gas engines. Three-way catalysts are inactive in oxygen rich environments, while the large size and expense of ammonia SCR installations make them an impractical solution in a distributed energy context.

$NO_x$ trap systems have received attention as a possible solution for lean $NO_x$ removal. These traps rely on bifunctional materials to store and reduce $NO_x$ under different engine cycles. Under lean conditions $NO_x$ is 'trapped' on alkali metal oxides, and the engine is then periodically run under rich conditions to accomplish reduction over precious metals. These changes in engine operating conditions would necessitate additional engine controls. Additionally, current trap materials such as Ba and Pt are susceptible to sintering and $SO_2$ poisoning.

The use of hydrocarbons as reducing agents in NO removal has attracted significant attention. The presence of hydrocarbons in current engine exhaust streams would make them a readily available and cost effective choice. However, hydrocarbon combustion, particularly in oxygen rich environments, may block NO reduction reactions.

As demands increase for methods of removing pollutants, the need arises for improved systems and methods of pollutant removal, especially systems operable to offset the hydrocarbon combustion in oxygen rich environments.

SUMMARY OF THE INVENTION

According to a first embodiment of the present invention, a catalyst system for reducing the content of nitrogen oxides in a gaseous stream containing nitric oxide (NO), hydrocarbons, carbon monoxide (CO), and oxygen ($O_2$) is provided. The catalyst system comprises an oxidation catalyst comprising a first metal supported on a first inorganic oxide for catalyzing the oxidation of NO to nitrogen dioxide ($NO_2$), and a reduction catalyst comprising a second metal supported on a second inorganic oxide for catalyzing the reduction of $NO_2$ to nitrogen ($N_2$).

According to a second embodiment of the present invention, a catalyst system for reducing the content of nitrogen oxides in a gaseous stream containing nitric oxide (NO), hydrocarbons, carbon monoxide (CO), and oxygen is provided. The catalyst system comprises an oxidation catalyst comprising cobalt on a zirconia support for catalyzing the oxidation of nitric oxide (NO) to nitrogen dioxide ($NO_2$), and a reduction catalyst comprising palladium on a sulfated zirconia or tungstated zirconia support for catalyzing the reduction of $NO_2$ to nitrogen ($N_2$).

According to a third embodiment of the present invention, a method of reducing the level of pollutants in a gaseous stream is provided. The method comprises providing a catalyst system comprising an oxidation catalyst and a reduction catalyst, and feeding a gaseous stream comprising nitric oxide (NO), hydrocarbons, carbon monoxide (CO), and oxygen ($O_2$) to the catalyst system. Additionally, the method comprises oxidizing the NO to nitrogen dioxide ($NO_2$) in the presence of the oxidation catalyst, and reducing the $NO_2$ to nitrogen ($N_2$) by reacting with hydrocarbons in the presence of the reduction catalyst to form a treated gaseous stream.

Additional features and advantages provided by embodiments of the present invention will be more fully understood in view of the following detailed description.

DETAILED DESCRIPTION

In accordance with one embodiment of the present invention, a catalyst system for reducing the content of nitrogen oxides in a gaseous stream containing nitric oxide (NO), hydrocarbons, carbon monoxide (CO), and oxygen ($O_2$) is provided. The catalyst system comprises an oxidation catalyst comprising a first metal supported on a first inorganic oxide for catalyzing the oxidation of NO to nitrogen dioxide ($NO_2$). The oxidation catalyst may comprise any combination of metals with inorganic oxides, which are suitable to accelerate the reaction of NO with oxygen to produce $NO_2$. The first metal may include, but is not limited to, cobalt, silver, or combinations thereof, and the first inorganic oxide may include, but is not limited to, titania, zirconia, alumina, or combinations thereof. In one exemplary embodiment, the oxidation catalyst may comprise cobalt on a zirconia support, wherein the oxidation catalyst comprises from about 1 to about 10% by weight of cobalt. The oxidation reaction may convert about 50% to about 90% by weight of the NO to $NO_2$, and, in one embodiment, may produce a conversion of between about 70% to about 90% by weight. The temperature of the oxidation may vary based on the components of the gaseous stream and the catalysts. The oxidation generally occurs at a temperature of about 200 to about 500° C. In a further embodiment, the above conversions may be achieved at a temperature of about 300° C.

Furthermore, the catalyst system also comprises a reduction catalyst comprising a second metal supported on a second inorganic oxide for catalyzing the reduction of $NO_2$ to nitrogen ($N_2$). The reduction catalyst may comprise any combination of metals with inorganic oxides suitable to accelerate the reaction of $NO_2$ with hydrocarbons in the gaseous stream to produce $N_2$. In some embodiments, the second metal may comprise palladium, and the second inorganic oxide may comprise titania, zirconia, alumina, or combinations thereof. The palladium may comprise about 0.1 to about 0.5% by weight of cobalt; however, other amounts are contemplated depending on the catalytic requirements of the reduction reaction. In one exemplary embodiment, the reduction catalyst comprises palladium on a sulfated zirconia support. The reduction reaction may convert about 50% to about 80% by weight of the $NO_2$ to $N_2$, and, in a further embodiment, may produce a conversion of between about 60% to about 80% by weight.

The high degree of conversion in the reduction step is due, in large part, to the initial oxidation step. $NO_2$ is more easily reduced than NO in a gaseous stream that includes both oxygen and hydrocarbons. For NO reduction, the combustion reaction of hydrocarbon in the presence of oxygen dominates over the reduction reaction of NO to $N_2$. By oxidizing NO to $NO_2$ and then reducing the $NO_2$, the conversion to $N_2$ is greatly enhanced, because the $NO_2$ reduction reaction is not substantially blocked by the hydrocarbon combustion, which is the case for NO reduction.

In the gaseous stream, the hydrocarbons may comprise various compounds known to one skilled in the art. These hydrocarbon compounds may include, but are not limited to, methane, ethane, propane, or combinations thereof. The oxygen in the gaseous stream may be fed in excess to overcome any thermodynamic limitations of the oxidation reaction. In one embodiment, the gaseous stream may comprise about 2 to about 15% $O_2$.

The catalyst system may comprise various configurations known to one skilled in the art. In one embodiment, the oxidation catalyst and the reduction catalyst are disposed on a catalyst bed. In a few exemplary embodiments, the catalyst bed may define a mixed bed, a monolith bed structure having oxidation and reduction catalysts embedded therein, or a bed comprising alternating layers or sections of oxidation and reduction catalysts. The catalysts can be combined in the system in several ways: physically mixing of catalyst powders, layering the catalyst powders, impregnating a single monolith support with both catalysts, or alternating sections of impregnated monolith support. The following catalyst production methods provide exemplary procedures for producing the oxidation and reduction catalysts of the present invention.

An oxidation catalyst comprised of cobalt supported on either titania or zirconia may be produced through incipient wetness or sol-gel techniques. The catalyst may contain between 1% and 10% cobalt by weight. The incipient wetness catalyst is prepared by first calcining the support (titania or zirconia) at 500° C. for 3 hours. Cobalt is then added to the support by the addition of a cobalt nitrate in water or ethanol solution, in amount equal to the pore volume of the support. The sample is then dried at 100° C. overnight. After drying the catalyst sample is calcined in air at temperatures between 300-600° C. for 3 hours. Based on final desired weight loading of cobalt several additions of cobalt nitrate solution may be used. The catalyst can be prepared either by drying, or by calcining the catalysts between cobalt nitrate solution additions. The sol-gel prepared catalysts are synthesized in a single step. A solution of titanium isopropoxide or zirconia propoxide (depending on the desired support material) in isopropyl alcohol is hydrolyzed with a solution of cobalt nitrate in water. The water is added under stirring, and once complete the resulting gel is dried in air overnight and then calcined at between 300-600° C. for 3 hours in air.

In producing the reduction catalyst comprising palladium supported on a sulfated zirconia support, the sulfated zirconia support is first prepared by pore volume addition of ammonium sulfate in water solution to a zirconia support. After the addition step, the treated support is dried at 100° C. overnight, then calcined in air at 500° C. for 3 hours. Palladium is added through pore volume additions of a palladium chloride and water solution. Small amounts of hydrochloric acid may be used to dissolve the palladium chloride. After adding the palladium chloride solution, the catalyst sample is dried at 100° C. overnight and then calcined in oxygen at 500° C. for 3 hours.

In addition to the removal of nitrogen oxides ($NO_x$), the catalyst system may also be operable to oxidize carbon monoxide and/or hydrocarbons. In one embodiment, the CO in the gaseous stream may be oxidized to carbon dioxide ($CO_2$) in the presence of the oxidation catalyst. In yet another embodiment, the catalyst system may also be operable to oxidize the hydrocarbons in the gaseous stream in the presence of the oxidation catalyst. Oxidizing the hydrocarbons may reduce the amount of unoxidized hydrocarbons, which may enhance the reduction of $NO_2$ to $N_2$. Thus, in a further embodiment, the catalyst system may comprise an additional oxidation catalyst, e.g. oxidation catalyst bed, to oxidize unreacted hydrocarbons after the reduction step. In an exemplary embodiment, a hydrocarbon feed comprising 85% methane/10% ethane/5% propane may be oxidized in the presence of an oxidation catalyst, wherein the ethane and propane are substantially oxidized at a temperature of about 275 to about 325° C. and the methane is substantially oxidized at a temperature of about 425 to about 450° C.

The present invention has numerous applications for pollutant removal from gaseous streams. In one embodiment, the catalyst system may be incorporated in a lean exhaust pollutant removal system. The lean exhaust removal system, which is applicable for lean burn engines, e.g. natural gas fuel engines, comprises an exhaust outlet in communication with the catalyst system and configured to deliver the gaseous stream to the catalyst system. To minimize costs, the lean exhaust removal system eliminates the need for the injection of additional hydrocarbon reducing agent in the reduction of $NO_2$. The system relies on the unburned hydrocarbon fuel remaining in exhaust. The lean exhaust removal system, as described herein, may also be applied to other devices, such as diesel engines and advanced gas reciprocating engines.

It is noted that terms like "preferably," "generally", "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A catalyst system for reducing the content of nitrogen oxides in a gaseous stream containing nitric oxide (NO) hydrocarbons, carbon monoxide (CO), and oxygen ($O_2$) comprising:
   an oxidation catalyst comprising a first metal supported on a first inorganic oxide for catalyzing the oxidation of NO to nitrogen dioxide ($NO_2$); and
   a reduction catalyst comprising a second metal supported on a second inorganic oxide for catalyzing the reduction of $NO_2$ to nitrogen ($N_2$), wherein the second inorganic oxide comprises sulfated zirconia or tungstated zirconia.

2. A catalyst system according to claim 1 wherein the first metal comprises cobalt, silver, or combinations thereof, and the second metal comprises palladium.

3. A catalyst system according to claim 1 wherein the first inorganic oxide and the second organic oxide comprise titania, zirconia, alumina, or combinations thereof.

4. A catalyst system according to claim 1 wherein the oxidation catalyst and Reduction catalyst are disposed on a catalyst bed.

5. A catalyst system according to claim 4 wherein the catalyst bed defines a mixed bed, a monolith bed structure having oxidation and reduction catalysts embedded therein, or a bed comprising alternating layers or sections of oxidation and reduction catalysts.

6. A catalyst system according to claim 1 wherein the oxidation catalyst comprises from about 1 to about 10% by weight of cobalt.

7. A catalyst system according to claim 1 wherein the catalyst system is operable to oxidize the CO in the gaseous stream to carbon dioxide ($CO_2$) in the presence of the oxidation catalyst.

8. A catalyst system according to claim 1 wherein the catalyst system is operable to oxidize the hydrocarbons in the gaseous stream in the presence of the oxidation catalyst.

9. A lean exhaust pollutant removal system comprising:
   a catalyst system according to claim 1; and
   an exhaust outlet configured to deliver the gaseous stream to the catalyst system.

10. A catalyst system for reducing the content of nitrogen oxides in a gaseous stream containing nitric oxide (NO), hydrocarbons, carbon monoxide (CO), and oxygen comprising:
    an oxidation catalyst comprising cobalt on a zirconia support for catalyzing the oxidation of nitric oxide (NO) to nitrogen dioxide ($NO_2$); and
    a reduction catalyst comprising palladium on a sulfated zirconia support for catalyzing the reduction of $NO_2$ to nitrogen ($N_2$).

11. A method of reducing the level of pollutants in a gaseous stream comprising:
    providing a catalyst system comprising an oxidation catalyst and a reduction catalyst comprising an inorganic oxide support, wherein the inorganic oxide support comprises sulfated zirconia or tungstated zirconia;
    feeding a gaseous stream comprising nitric oxide (NO), hydrocarbons, carbon monoxide (CO), and oxygen ($O_2$) to the catalyst system;
    oxidizing the NO to nitrogen dioxide ($NO_2$) in the presence of the oxidation catalyst; and
    reducing the $NO_2$ to nitrogen ($N_2$) by reacting with hydrocarbons in the presence of the reduction catalyst to form a treated gaseous stream.

12. A method according to claim 11 further comprising oxidizing the CO to carbon dioxide ($CO_2$) in the presence of the oxidation catalyst.

13. A method according to claim 11 wherein the hydrocarbons comprise methane, ethane, propane, and combinations thereof.

14. A method according to claim 11 further comprising oxidizing at least a portion of the hydrocarbons, the unoxidized hydrocarbons being utilized in the reduction of $NO_2$ to $N_2$.

15. A method according to claim 11 wherein the oxidation occurs at a temperature of about 200 to about 500° C.

16. A method according to claim 11 further comprising,
    exposing the treated gaseous stream to an additional oxidation catalyst; and
    oxidizing hydrocarbons not reacted in the oxidation or reduction reactions.

17. A method according to claim 11 wherein from about 50% to about 90% of the NO is oxidized to $NO_2$.

18. A method according to claim 11 wherein from about 50% to about 80% of the $NO_2$ is reduced to $N_2$.

19. A method according to claim 11 wherein the gaseous stream comprises about 2 to about 15% $O_2$.

* * * * *

UNITED STATES PATENT AND TRADEMARK OFFICE
CERTIFICATE OF CORRECTION

| | |
|---|---|
| PATENT NO. | : 7,488,462 B2 |
| APPLICATION NO. | : 11/411993 |
| DATED | : February 10, 2009 |
| INVENTOR(S) | : Ozkan et al. |

Page 1 of 1

It is certified that error appears in the above-identified patent and that said Letters Patent is hereby corrected as shown below:

Col. 5, line 23 "Reduction" should read --reduction--.

Signed and Sealed this

Twenty-sixth Day of May, 2009

JOHN DOLL
*Acting Director of the United States Patent and Trademark Office*